(12) United States Patent
Cho et al.

(10) Patent No.: US 9,507,160 B2
(45) Date of Patent: Nov. 29, 2016

(54) DISPLAY APPARATUS AND METHOD OF DISPLAYING THREE DIMENSIONAL IMAGES USING THE SAME

(71) Applicant: Samsung Display Co., LTD., Yongin, Gyeonggi-Do (KR)

(72) Inventors: Jung-Hyun Cho, Suwon-si (KR); Moon-Jung Baek, Suwon-si (KR); Ryota Odake, Hwaseong-si (KR); Seung-Jun Yu, Suwon-si (KR); Jin-Hwan Kim, Suwon-si (KR); Do-Yeong Park, Seoul (KR); Jong-Suk Lee, Daegu (KR); Jae-Woo Jung, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 600 days.

(21) Appl. No.: 13/749,071

(22) Filed: Jan. 24, 2013

(65) Prior Publication Data

US 2014/0063015 A1    Mar. 6, 2014

(30) Foreign Application Priority Data

Aug. 30, 2012    (KR) .................. 10-2012-0095843

(51) Int. Cl.
   *G02B 27/22*    (2006.01)
   *G06T 15/50*    (2011.01)
   *H04N 13/04*    (2006.01)

(52) U.S. Cl.
   CPC ......... *G02B 27/2214* (2013.01); *G06T 15/506* (2013.01); *H04N 13/0406* (2013.01); *H04N 13/0411* (2013.01)

(58) Field of Classification Search
   None
   See application file for complete search history.

(56) References Cited

U.S. PATENT DOCUMENTS

| 7,952,548 | B2 | 5/2011 | Kim et al. |
| 2006/0126177 | A1 | 6/2006 | Kim et al. |
| 2008/0079662 | A1* | 4/2008 | Saishu et al. .................. 345/55 |
| 2008/0278805 | A1* | 11/2008 | Schwerdtner ................ 359/463 |
| 2010/0039573 | A1 | 2/2010 | Park et al. |
| 2011/0050084 | A1* | 3/2011 | Hwang .................... H01J 11/12 313/485 |
| 2011/0051239 | A1* | 3/2011 | Daiku ........................... 359/464 |
| 2011/0157339 | A1* | 6/2011 | Bennett et al. ................ 348/59 |

FOREIGN PATENT DOCUMENTS

KR    1020060124849 A    12/2006

* cited by examiner

*Primary Examiner* — Michelle Chin
(74) *Attorney, Agent, or Firm* — Innovation Counsel LLP

(57) ABSTRACT

A display apparatus includes a display panel, a light source part and a directional light projecting element. The display panel displays a first image during a first subframe and a different second image during a second subframe. The light source part provides light to the display panel. The directional light projecting element is disposed between the display panel and the light source part. The directional light projecting element includes a barrier part and a lens part disposed above the barrier part. The barrier part has a plurality of barriers defined as a plurality of first electrodes and a plurality of second electrodes crossing the first electrodes. The lens part has a plurality of lenses disposed in a first direction and a second direction crossing the first direction. Each of the lenses corresponds to a subset of plural lenses among the plurality of the barriers.

21 Claims, 15 Drawing Sheets

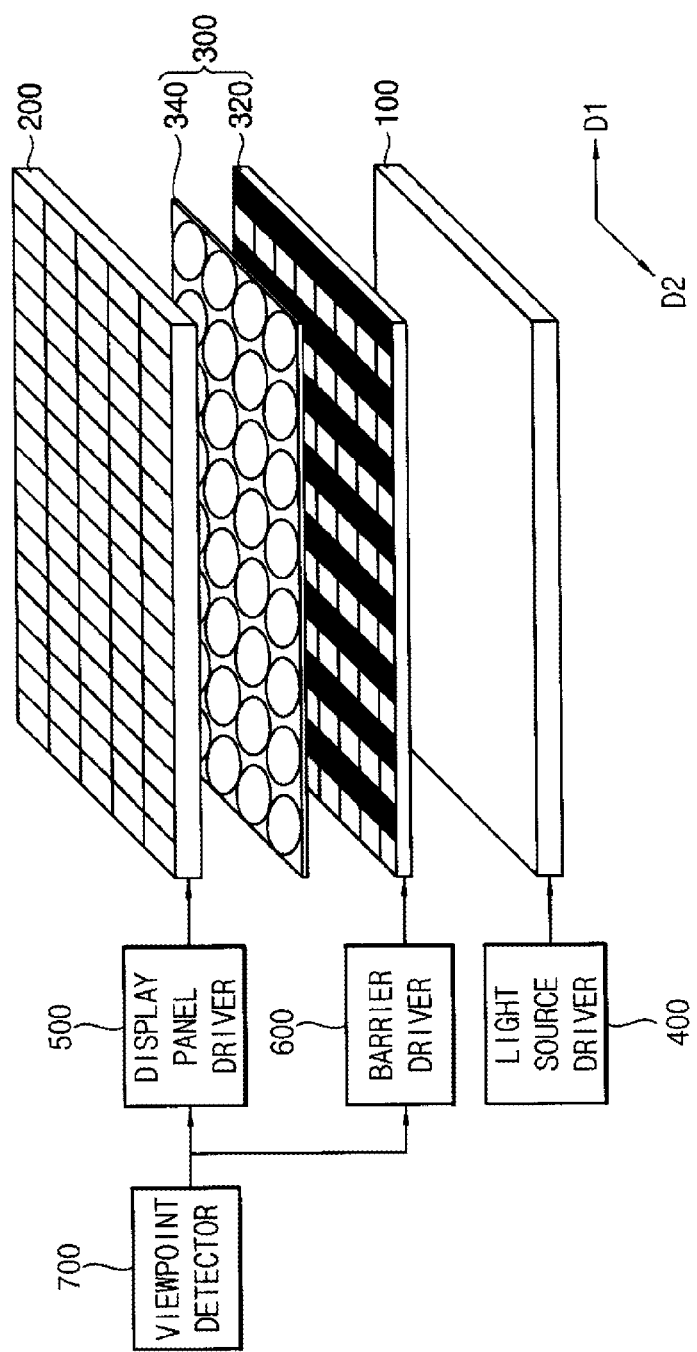

ated herein.

DISPLAY APPARATUS AND METHOD OF DISPLAYING THREE DIMENSIONAL IMAGES USING THE SAME

CROSS-REFERENCE TO RELATED APPLICATION

This application claims priority to Korean Patent Application No. 10-2012-0095843, filed on Aug. 30, 2012, and all the benefits accruing therefrom under 35 U.S.C. §119, the contents of which application are herein incorporated by reference in their entireties.

BACKGROUND

1. Field of Disclosure

Exemplary embodiments of the present invention relate to a display apparatus and a method of displaying three-dimensional ("3D") images using the display apparatus. More particularly, exemplary embodiments of the present invention relate to a display apparatus improving a display quality and a method of displaying 3D images using the display apparatus.

2. Description of Related Technology

Generally, a liquid crystal display apparatus produces a two-dimensional ("2D") image. Recently, as a demand for displaying a 3D image have been increasing in the video gaming and movie industries, liquid crystal display apparatuses have been developed for creating a perception of 3D images.

Generally, a stereoscopic image displaying apparatus creates a perception of a 3D image by using a binocular parallax phenomenon between the two eyes of a human being. For example, as the two eyes of a human are spaced apart from each other, images viewed at different angles are inputted to the human brain. The human brain then mixes the images so that a viewer may recognize the stereoscopic image as a 3D one.

Stereoscopic image displaying devices may be divided into a stereoscopic type and an auto-stereoscopic type depending on whether a viewer wears a special pair of spectacles for creating the 3D effect or not. The stereoscopic type may include an anaglyph type and a shutter glass type and so on. In the anaglyph type, a blue spectacle and a red spectacle may be required for the viewer to wear. In the shutter glass type, a left image and a right image may be temporally divided to be periodically displayed, and a viewer wears correspondingly synchronized shutter glasses which open and close a left eye LE shutter and a right eye RE shutter in synchronization with the displaying of the left and right images.

The auto-stereoscopic type may include a lenticular type and a barrier type. In the lenticular type, a lenticular lens having a plurality of focal points is used. The 2D image is refracted by the lenticular lens at the focal points so that the 3D image is displayed. In the barrier type, a plurality of barriers selectively cover different areas of a display panel. The barriers thus selectively block an image on the display panel so that a left image portion and a right image portion become different from each other. Thus, the 2D image is converted into the 3D image by use of the barriers, typically in combination with shutter glasses or other means.

When two eyes of a viewer are disposed in a horizontal direction aligned with a corresponding horizontal axis of the display device, the 3D image is well recognized to the viewer in the auto-stereoscopic type display device. However, when two eyes of the viewer are disposed in a vertical direction that crosses with a horizontal axis of the display device, or in a direction inclined with respect to the horizontal direction of the display device, the 3D image may not be shown to the viewer. This is particularly a problem with mobile or portable displays such as found in smartphones and tablet computers where the user can easily rotate the apparatus to have different angles relative to the normal horizontal line of the eyes.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

BRIEF SUMMARY

The present disclosure of invention provides a display apparatus capable of properly presenting a three-dimensional ("3D") image according to a viewer irrespective of the relative angle made between the normal horizontal of the display and the eye-to-eye connection line of the two eyes of a viewer.

Exemplary embodiments of the present disclosure also provide a method of displaying the 3D image using the display apparatus.

In an exemplary embodiment of a display apparatus according to the present disclosure, the display apparatus includes a display panel, a light source part and a directional light projecting element. The display panel displays a first image during a first subframe and a different second image during a second subframe. The light source part provides backlighting light to the display panel. The directional light projecting element is disposed between the display panel and the light source part. The directional light projecting element includes a barrier part and a lens part disposed above the barrier part. The barrier part has a plurality of barriers defined as a plurality of first electrodes and a plurality of second electrodes crossing the first electrodes. The lens part has a plurality of lenses disposed in a first direction and a second direction crossing the first direction. Each of the lenses corresponds to a subset of plural and adjacent barriers among the plurality of barriers.

In an exemplary embodiment, one lens may correspond to the barriers disposed in an M by M matrix. M is a positive integer equal to or greater than 2.

In an exemplary embodiment, the lens have a refracting portion of circular shape In an exemplary embodiment, centers of four lenses adjacent to each other form a square.

In an exemplary embodiment, centers of three lenses adjacent to each other form an isometric triangle.

In an exemplary embodiment, the lens part further comprises a light blocking material disposed where the lenses are not disposed.

In an exemplary embodiment, a bottom portion of each lens may have a square shape and an upper portion of each lens has a circular shape.

In an exemplary embodiment, a bottom portion of the lens may have a regular hexagonal shape and an upper portion of the lens has a circular shape.

In an exemplary embodiment, a proper distance for a viewer to view a three-dimensional ("3D") image from a principal point of the lens is D, a focal length of the lens is f, a distance between the principal point of the lens and the barrier part is d and a refractive index of the lens is n.

$$d = \frac{n}{\left(\frac{1}{f} - \frac{1}{D}\right)}.$$

In an exemplary embodiment, a display area of a viewpoint image corresponding to one eye of the viewer at the proper distance D is PE, a pitch of a barrier unit, which includes the barriers corresponding to one lens, in the first direction is Pb.

$$Pb = 2 \times PE \times \frac{d}{n \times D}.$$

In an exemplary embodiment, a pitch of the lens in the first direction is Pl.

$$Pl = Pb \times \frac{D}{D + \frac{d}{n}}.$$

In an exemplary embodiment, a side dimension of the projected area PE of the viewpoint image corresponding to one eye of the viewer at the proper distance D may be a distance between two eyes of the viewer.

In an exemplary embodiment, the display panel may be operated in a horizontal mode, in which two eyes of a viewer are disposed in a horizontal direction, or in a vertical mode, in which two eyes of the viewer are disposed in a vertical direction. The barriers having transmitting states may be disposed as lines extending in the vertical direction in the horizontal mode. The barriers having the transmitting states are disposed as lines extending in the horizontal direction in the vertical mode.

In an exemplary embodiment, the display panel may be operated in an inclination mode, in which two eyes of a viewer are disposed in a direction inclined with respect to the display panel. The barriers having transmitting states may be disposed as lines extending in a direction substantially perpendicular to a line connecting two eyes of the viewer in the inclination mode.

In an exemplary embodiment, the display apparatus may further include a viewpoint detector and/or determiner configured for tracking and/or determining a viewpoint of a viewer relative to the display panel.

In an exemplary embodiment, the transmitting states of the barriers of the barrier part and the blocking states of the barriers of the barrier part may be adjusted according to a move of the viewpoint of the viewer.

In an exemplary embodiment of a method of displaying a three-dimensional ("3D") image according to the present disclosure of invention, the method includes providing first image data to a display panel during a first subframe and second image data to the display panel during a second subframe, providing backlighting light to the display panel, selectively transmitting the light from a light source part using a barrier part, the barrier part having a plurality of barriers defined as a plurality of first electrodes and a plurality of second electrodes crossing the first electrodes and refracting the light from the barrier part using a lens part, the lens part having a plurality of lenses disposed in a first direction and a second direction crossing the first direction, each of the lenses corresponding to a plurality of the barriers.

In an exemplary embodiment, one lens may correspond to the barriers disposed in an M by M matrix. M is a positive integer equal to or greater than 2.

In an exemplary embodiment, a proper distance for a viewer to view the 3D image from a principal point of the lens is D, a focal length of the lens is f, a distance between the principal point of the lens and the barrier part is d and a refractive index of the lens is n.

$$d = \frac{n}{\left(\frac{1}{f} - \frac{1}{D}\right)}.$$

In an exemplary embodiment, a display area of a viewpoint image corresponding to one eye of the viewer at the proper distance D is PE, a pitch of a barrier unit, which includes the barriers corresponding to one lens, in the first direction is Pb.

$$Pb = 2 \times PE \times \frac{d}{n \times D}.$$

In an exemplary embodiment, a pitch of the lens in the first direction is Pl.

$$Pl = Pb \times \frac{D}{D + \frac{d}{n}}.$$

According to the display apparatus and the method of displaying the 3D image using the display apparatus, the display apparatus includes barriers disposed in a matrix form and lenses corresponding to the barriers so that the display apparatus may properly represent the 3D image according to a direction of two eyes of a viewer relative to a predefined axis of the display panel.

Other aspects of the present disclosure of invention will become apparent from the below more detailed descriptions.

BRIEF DESCRIPTION OF THE DRAWINGS

The above and other features and advantages of the present disclosure of invention will become more apparent by describing in detailed exemplary embodiments thereof with reference to the accompanying drawings, in which:

FIG. 1 is a perspective view illustrating a display apparatus according to an exemplary embodiment of the present disclosure;

DETAILED DESCRIPTION

Figure 2A:
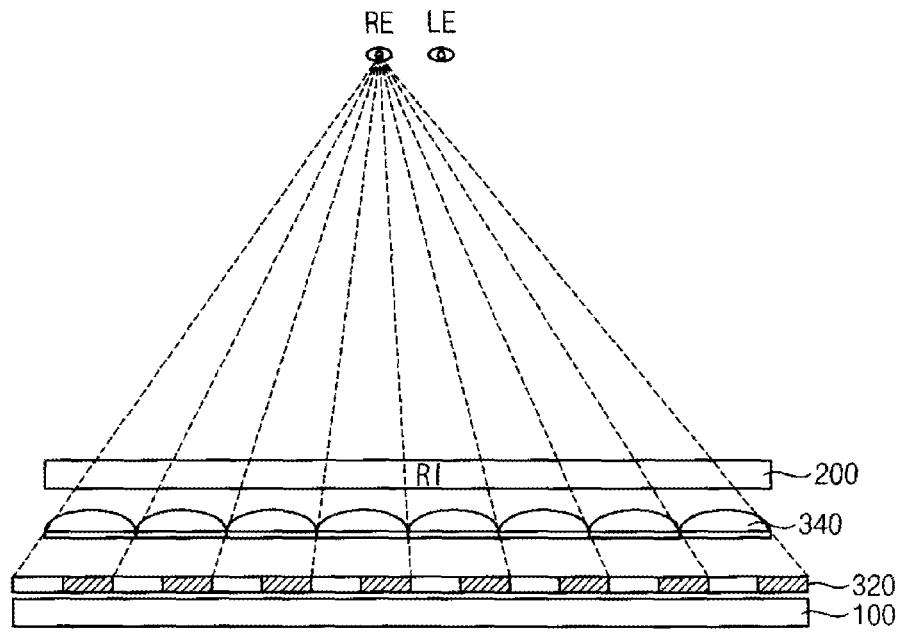
FIG. 2A is a conceptual diagram illustrating images provided to a right eye RE of a viewer by a display panel and a first operational state of the directional light projecting element of FIG. 1 in a first subframe.

Hereinafter, exemplary embodiments in accordance with the present disclosure of invention will be described in further detail with reference to the accompanying drawings.

FIG. 1 is a perspective view illustrating a display apparatus according to a first exemplary embodiment.

Referring to FIG. 1, the display apparatus includes a light source part 100, a display panel 200, a directional light projecting element 300, a light source driver 400, a display panel driver 500 and a barrier driver 600. The display apparatus may further include a viewpoint detector/determiner 700 which detects and/or determines a relative viewpoint relation between the two eyes of the viewer and major axis of the display panel 200 (e.g., rotated 90 degrees, upside down, etc.).

The light source part 100 provides a backlighting light to the display panel 200. The light source part 100 includes one or more light sources configured for generating light. For example, the light source may include a cold cathode fluorescent lamp ("CCFL"), an external electrode fluorescent lamp ("EEFL"), a flat fluorescent lamp ("FFL"), a light emitting diode ("LED").

The light source part 100 may be a direct backlighting type of light source part which is disposed under the display panel 200 to provide light in line directly to the display panel 200. Alternatively, the light source part 100 may be an edge type of backlighting light source part which is disposed corresponding to an edge of the display panel 200 to provide a light to the display panel 200. When the light source part 100 is the edge type light source part, the light source part 100 may further include a light guide plate (LGP, not shown).

The display panel 200 selectively modulates light rays that it receives from the light source part 100 so as to thereby form an image. The display panel 200 is disposed on the light source part 100. The display panel 200 includes a plurality of respective, image-defining pixels. The pixels may be disposed in a matrix pattern and they may be of a much finer resolution than so-called, barrier pixels described herein. (In other words, that can be many image-defining pixels for each one barrier pixel.) The display panel includes a first panel substrate (e.g., a pixel electrodes supporting substrate, not shown), a second panel substrate (e.g., a common electrode supporting substrate, not shown) facing the first panel substrate and a liquid crystal layer (not shown) disposed between the first and second panel substrates.

The directional light projecting element 300 is disposed between the light source part 100 and the display panel 200 and operates to selectively determine a light rays projecting state for light rays projected through the display panel 200 (e.g., tilted left, tilted right, tilted up, tilted down). The directional light projecting element 300 includes a barriers part 320 and a lenses part 340. The directional light projecting element 300 selectively adjusts the light-rays projecting angle from the light source part 100 to the display panel 200 to thereby control the converting of a 2D image present on the surface of the display panel 200 into a 3D image as perceived by the viewer when in a corresponding viewpoint orientation relative to the display panel 200.

Figure 2B:
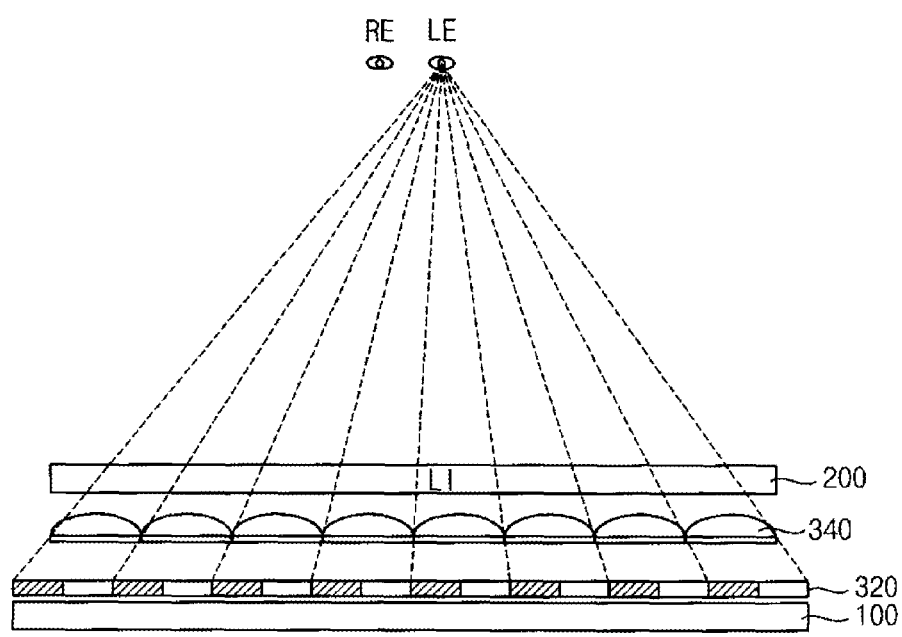
FIG. 2B is a conceptual diagram illustrating images provided to a left eye LE of the viewer by the display panel and a second operational state of the directional light projecting element of FIG. 1 in a second subframe.

A method of converting the 2D image into the 3D image by use of the directional light projecting element 300 is now explained while referring to FIGS. 2A and 2B in more detail.

The barrier part 320 is disposed above the light source part 100. The barrier part 320 includes a plurality of barrier pixels (or more simply herein, "barriers") which are selectively closed or opened to thereby selectively block or pass through light rays from corresponding regions of the light source part 100 toward the lenses part 340. In other words, the barriers selectively transmit or block their respective light rays from reaching corresponding areas of the lenses part 340 after departing from the light source part 100.

The barrier part 320 includes a plurality of first electrodes each extending in a first direction and a plurality of second electrodes each extending in a second and different direction and thus crossing with the first electrodes. The barriers are defined by the crossing regions of the first electrodes and the second electrodes and by liquid crystal material disposed therebetween. The barriers are disposed in a matrix form.

More specifically, the barrier part 320 includes a first barrier substrate, a second barrier substrate facing the first barrier substrate, a barrier liquid crystal layer disposed between the first and second barrier substrates and at least one polarizing sheet or plate associated with the barrier part 320 (where an orthogonal second polarizing sheet or plate may be formed on the bottom of the display panel 200).

The first electrodes may be formed on the first barrier substrate. The second electrodes may be formed on the second barrier substrate. According to voltages applied to the first and second electrodes, the barrier of the barrier part 320 has a transmitting state or a blocking state.

The barriers may have transmitting states along a specific direction. The barriers may have blocking states along the specific direction. In FIG. 1, the barriers have the transmitting states along a second direction D2. The direction of the barriers having the transmitting states may vary according to a mode of the display panel 200.

For example, the display panel 200 may be operated according to a horizontal mode, in which two eyes of the viewer are disposed in a horizontal direction, or in a vertical mode, in which two eyes of the viewer are disposed in a vertical direction. In the horizontal mode, the barriers having the transmitting states are disposed in the vertical direction. In the vertical mode, the barriers having the transmitting states are disposed in the horizontal direction.

For example, the display panel 200 may be operated in an inclination mode. In the inclination mode, two eyes of the viewer are disposed in an inclined direction with respect to the display panel 200. In the inclination mode, the barriers having the transmitting states are disposed in a direction substantially perpendicular to a line connecting two eyes of the viewer. Alternating lines of light ray blocking barriers and light ray passing barriers reciprocate back and forth so as to alternatingly direct their projected light rays (with aid of the corresponding lenses) to the left eye and then the right eye and then the left eye again, etc.

Figure 3:
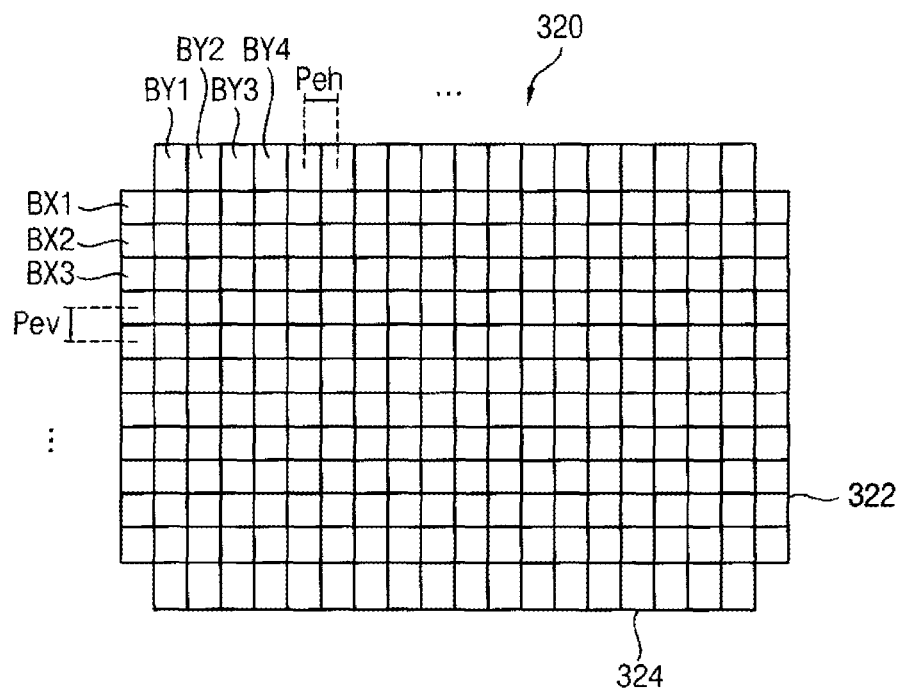
FIG. 3 is a plan view illustrating a barrier part of FIG. 1.

A structure of the barrier part 320 is explained referring to FIG. 3 in detail.

The lens part 340 is disposed above the barrier part 320. The lens part 340 refracts the light rays that are selectively passed through the barrier part 320 to thereby transmit those light rays at selected projecting angles to and through the display panel 200 and then to the viewer's left and right eyes.

The lens part 340 includes a plurality of lenses. The lenses are disposed as rows extending in a first direction D1 and as columns extending in the second direction D2. Each of the lenses covers an area corresponding to a plurality of the barriers. For example, one lens may cover an area corresponding to smaller barriers disposed in that same area as an M by M matrix of barriers. Herein, M is a positive integer equal to or greater than two.

Figure 6:
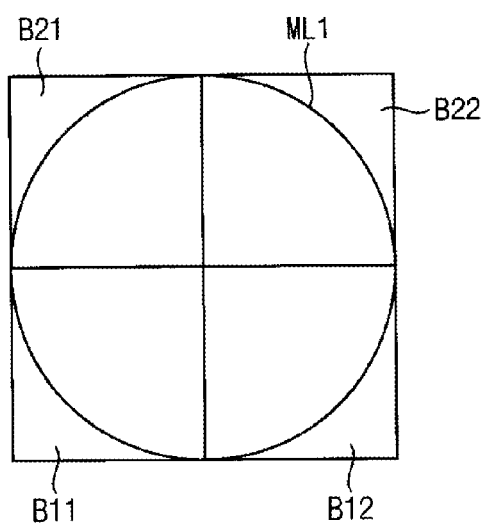
FIG. 6 is a conceptual diagram illustrating a plurality of barriers pixels (or more simply herein, "barriers") corresponding to one lens of FIG. 4.

A structure of the lens part 340 for the case of M=2 is explained referring to FIG. 6 as an example.

Referring to FIG. 1, the light source driver 400 is connected to drive the light source part 100. In one embodiment, the light source driver 400 is further connected (not shown) to the display panel driver 500 so that operations of the two are coordinated. The light source driver 400 generates one or more light source driving voltages for driving respective light sources. The light source driver 400 receives a light source control signal from outside. The light source driver 400 generates the light source driving voltage based on the light source control signal. The light source driver 400 outputs the light source driving voltage to the light source part 100. The light source driver 400 may include a DC (direct current) to DC converter.

The light source driver 400 may be disposed under the light source part 100. The light source driver 400 may be disposed outside of a light source receiving container (not shown) and facing a bottom surface of the receiving container.

The display panel driver 500 is connected to the display panel 200. The display panel driver 500 generates a panel driving signal for driving the display panel 200. The display panel driver 500 drives the display panel 200 by dividing a single frame into N subframes. Here, N is a positive integer equal to or greater than two. For example, N may be two where a first subframe defines an image to be projected to the left eye and a second subframe defines an image to be projected to the right eye.

More specifically and as an example, the display panel driver 500 divides a single 3D frame into a first subframe and a second subframe. The first subframe may be an odd-numbered frame. The second subframe may be an even-numbered frame. The display panel driver 500 provides first image to the display panel 200 during the first subframe. The display panel 200 displays a first image during the first subframe. The display panel driver 500 provides second image to the display panel 200 during the second subframe. The display panel 200 displays a second image during the second subframe.

The display panel driver 500 includes a gate lines driver and a data lines driver.

The gate lines driver generates gate signals for driving the gate lines of the display panel 200. The gate lines driver outputs the gate signals to the gate lines. The gate lines driver sequentially outputs the gate signals to the gate lines so that the display panel 200 is driven by a scanning driving method.

The data lines driver generates data voltages for driving the data lines of the display panel 200. The data lines driver outputs the data voltages to the data lines.

The display panel driver 500 may adjust the image of the display panel 200 based on viewpoint tracking/determining information received from the viewpoint detector/determiner 700. For example, the display panel driver 500 may determine the horizontal mode and the vertical mode of the display panel 200 based on the viewpoint tracking information. Alternatively, the display panel driver 500 may determine the horizontal mode and the vertical mode of the display panel 200 based on a user's setting.

The barrier driver 600 is connected to the barrier part 320. The barrier driver 600 generates a barrier driving signal for driving the barrier part 320. The barrier driver 600 drives the barrier part 320 by dividing a single frame into N subframes.

For example, the barrier driver 600 divides a single frame into a first subframe and a second subframe. The barrier driver 600 controls a first group of the barriers and a second group of the barriers so that the barriers in the first group have the transmitting states during the first subframe and the barriers in the second group have the blocking states during the first subframe but the situation flips for the second subframe and then it is the barriers in the second group that have transmitting states during the second subframe.

The barrier driver 600 may drive the barrier part 320 using the viewpoint tracking information received from the viewpoint detector 700. The barrier driver 600 may switch the transmitting states of the barriers and the blocking states of the barriers according to a move of the viewpoint of the viewer.

The viewpoint detector 700 detects the viewpoint of the viewer. The viewpoint detector 700 may determine positions of two eyes of the viewer and/or a position of the display device relative to gravity. In addition, the viewpoint detector 700 may determine an inclined angle of two eyes of the viewer based on the positions of two eyes of the viewer. The viewpoint detector 700 detects the viewpoint of the viewer and outputs the viewpoint tracking information to the display panel driver 500 and the barrier driver 600.

The viewpoint detector 700 may include a camera. The viewpoint detector 700 may be disposed at a bezel portion of a receiving container receiving the display panel 200.

FIG. 2A is a conceptual diagram illustrating images provided to a right eye RE of the viewer by the display panel 200 and by the directional light projecting element 300 of FIG. 1 in the first subframe. FIG. 2B is a conceptual diagram illustrating images provided to a left eye LE of the viewer by the display panel 200 and by the directional light projecting element 300 of FIG. 1 in the second subframe.

Hereinafter, a method of displaying the 3D image of the display apparatus when the display panel 200 is driven by dividing frames into the first subframe and the second subframe is explained in detail referring to FIGS. 1, 2A and 2B.

Referring to FIG. 2A, the display panel 200 displays a first image RI in the first subframe. The first image RI may represent a right image intended for the right eye RE of the viewer.

During the first subframe, the barriers in the first group have transmitting states and the barriers in the second group have blocking states. The barriers in the first group and the barriers in the second group may be alternately disposed with each other in the horizontal direction in the horizontal mode. The barriers in the first group and the barriers in the second group may be alternately disposed with each other in the vertical direction in the vertical mode.

During the first subframe, the light rays from the light source part 100 have respective first paths, which are focused toward the right eye RE of the viewer, where the respective first paths are determined by the barriers in the first group having the transmitting states and by the portions of the lenses of the lens part 340 through which the light rays of the non-blocking barriers pass.

Thus, the right eye RE of the viewer views the right image RI based on the light having the first path during the first subframe.

Referring to FIG. 2B, the display panel 200 displays second image LI in the second subframe. The second image LI may represent a left image for the left eye LE of the viewer.

During the second subframe, the barriers in the first group have blocking states and the barriers in the second group have transmitting states. The barriers in the first group and the barriers in the second group may be alternately disposed with each other in the horizontal direction in the horizontal mode. The barriers in the first group and the barriers in the second group may be alternately disposed with each other in the vertical direction in the vertical mode.

During the second subframe, the light rays from the light source part 100 have respective second paths, which are focused toward the left eye LE of the viewer, where the respective second paths are determined by barriers in the second group having the transmitting states and be the portions of the lenses of the lens part 340 through which the light rays of the non-blocking barriers pass.

Thus, the left eye LE of the viewer views the left image LI based on the light having the second path during the second subframe.

Therefore, the brain of the viewer temporally mixes the right images RI inputted for the right eye RE and the left images LI inputted from the left eye LE so that the viewer may recognize a corresponding 3D image.

FIG. 3 is a plan view illustrating the barrier part 320 of FIG. 1.

Referring to FIGS. 1 and 3, the barrier part 320 includes the first barrier substrate 322, the second barrier substrate 324 facing the first barrier substrate 322 and the barrier liquid crystal layer (not shown) disposed between the first and second barrier substrates 322 and 324.

The first barrier substrate 322 includes a plurality of elongated and transparent first electrodes BX1, BX2, BX3, . . . , extending in the horizontal direction (D1). The second barrier substrate 324 includes a plurality of elongated and transparent second electrodes BY1, BY2, BY3, . . . , extending in the vertical direction (D2). The barriers are each defined at a respective area at which the first electrodes BX1, BX2, BX3, . . . and the second electrodes BY1, BY2, BY3, . . . cross with each other. The barriers are disposed in a matrix pattern.

A vertical pitch Pev of the first electrodes is defined as a center-to-center distance between the adjacent first electrodes. A horizontal pitch Peh of the second electrodes is defined as a center-to-center distance between the adjacent second electrodes. In the present exemplary embodiment, the pitch Pev of the first electrode may be equal to the pitch Peh of the second electrode.

Figure 4:
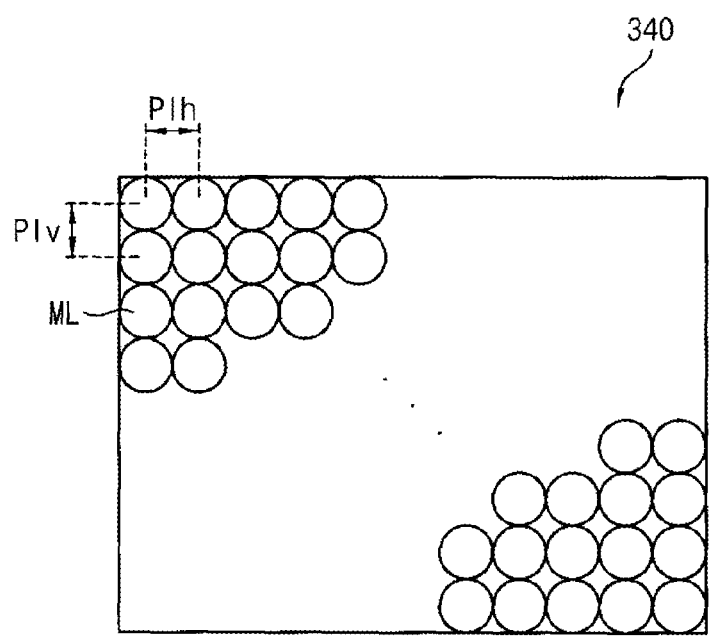
FIG. 4 is a plan view illustrating a lens part of FIG. 1 which in one specific embodiment, has a plurality of frusto spherical lenses each aligning over a corresponding four barrier pixels of the barrier part of FIG. 3.

FIG. 4 is a plan view illustrating the lens part 340 of FIG. 1.

Referring to FIGS. 1 and 4, the lens part 340 includes a plurality of lenses ML. The lenses ML may be disposed to define rows thereof extending in the first direction D1 and columns thereof extending in the second direction D2.

For example, each lens ML has a circular shape when viewed from a top plan perspective. For example, a bottom portion of the lens ML has a circular shape in a plan view and an upper portion of the lens ML has a side-view circular shape having a radius less than a radius of the bottom portion. In other words, each lens ML may be a frusto ellipsoid with a circular base.

In the present exemplary embodiment, centers of four lenses ML form a square.

A horizontal pitch Plh of the lens ML in the first direction D1 is defined as a distance between the adjacent lenses ML in the first direction D1. A vertical pitch Plv of the lens ML in the second direction D2 is defined as a distance between the adjacent lenses ML in the second direction D2. In the present exemplary embodiment, the pitch Plh of the lens ML in the first direction D1 may be equal to the pitch Plv of the lens ML in the second direction D2.

Figure 5:
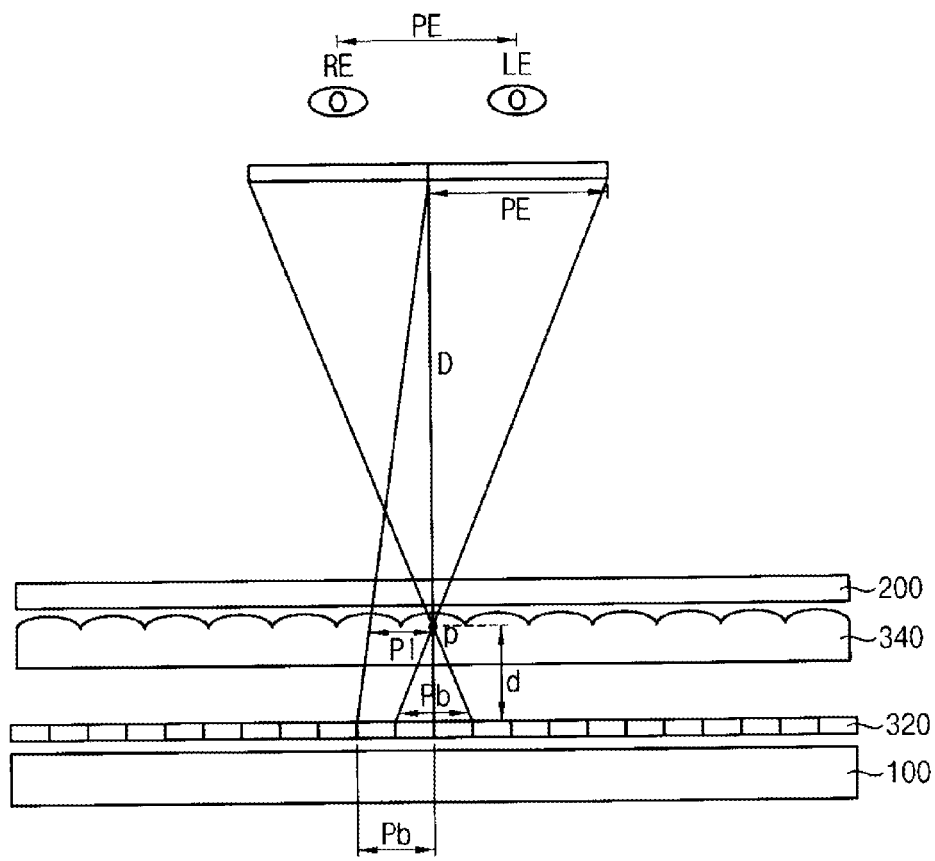
FIG. 5 is a conceptual diagram illustrating a display area of the image shown to the viewer at a proper distance by the display panel and the directional light projecting element of FIG. 1.

FIG. 5 is a conceptual diagram illustrating a display area of the image shown to the viewer at an appropriate user-to-device distance D and as produced by the combination of the display panel 200 and the directional light projecting element 300 (320 plus 340) of FIG. 1.

Referring to FIGS. 1 to 5, the appropriate distance D here means the distance where the 3D image is well displayed to the viewer using the display apparatus. The appropriate distance D is determined from a principal point p of a respective lens ML.

When a focal length of the lens ML is f, a distance between the principal point p of the lens ML and the barrier part 320 is d and a refractive index of the lens ML is n, the distance d between the principal point p of the lens ML and the barrier part 320 may be determined in accordance with Equation 1:

$$d = \frac{n}{\left(\frac{1}{f} - \frac{1}{D}\right)} \quad \text{[Equation 1]}$$

A projected viewpoint image portion corresponding to one eye of the viewer at the proper distance D may be referred as PE to properly display the 3D image with one corresponding barrier in the blocking mode and the other in the light-passing mode. The projected area PE of the viewpoint image may be determined based on a distance of two eyes of the viewer. For example, the projected area PE of the viewpoint image may have a side view dimension that is substantially the same as the distance between the two eyes of the viewer. For example, the projected area PE of the viewpoint image may be set as a square or circle having a corresponding width or diameter equal to an average distance of two eyes of an average human user.

The plural barriers corresponding to one lens ML may be referred as herein one barrier unit (BU). A pitch Pb of the barrier unit (BU) in a specific direction may be determined in accordance with following Equation 2.

$$Pb = 2 \times PE \times \frac{d}{n \times D} \quad \text{[Equation 2]}$$

As shown in FIG. 5, a relationship between Pb and PE may be determined by similarity of triangles. The pitch Pb of the barrier unit may be a sum of a width of a transmitting area of the barrier unit and a width of a blocking area of the barrier unit. The width of the transmitting area of the barrier unit may be equal to Pb/2.

When the two eyes of a viewer are disposed in the horizontal direction, the display panel 200 is operated in a corresponding horizontal mode, and a pitch of the barrier unit in the horizontal direction is Pbh. The pitch Pbh of the barrier unit in the horizontal direction may be determined in accordance with Equation 3.

$$Pbh = 2 \times PEh \times \frac{d}{n \times D} \quad \text{[Equation 3]}$$

When two eyes of the viewer are disposed in the vertical direction, the display panel 200 is operated in the vertical mode, and a pitch of the barrier unit in the vertical direction is Pbv. The pitch Pbv of the barrier unit in the vertical direction is determined as Equation 4.

$$Pbv = 2 \times PEv \times \frac{d}{n \times D} \quad \text{[Equation 4]}$$

The projected area side dimension PEh of the viewpoint image corresponding to one eye of the viewer at the proper distance D in the horizontal direction may be substantially the same as the projected area dimension PEv of the viewpoint image corresponding to one eye of the viewer at the proper distance D in the vertical direction. Alternatively, the projected area dimension PEh of the viewpoint image corresponding to one eye of the viewer at the proper distance D in the horizontal direction may be different from the projected area dimension PEv of the viewpoint image corresponding to one eye of the viewer at the proper distance D in the vertical direction according to an arrangement of the lenses ML (for example if the lenses ML is asymmetrical; e.g., not circular at its base).

A pitch Pl of the lens ML (in other words, the distance between the apex of one lens and the next) in a specific direction may be determined as Equation 5.

$$Pl = Pb \times \frac{D}{D + \frac{d}{n}} \quad \text{[Equation 5]}$$

As shown in FIG. 5, a relationship between Pl and Pb may be determined by similarity of triangles.

When two eyes of the viewer are disposed in the horizontal direction, the display panel 200 is operated in the horizontal mode, and a pitch of the lens ML in the horizontal direction is Plh. The pitch Plh of the lens ML in the horizontal direction is determined as Equation 6.

$$Plh = Pbh \times \frac{D}{D + \frac{d}{n}} \quad \text{[Equation 6]}$$

When the two eyes of the viewer are disposed in the vertical direction, the display panel 200 is operated in the vertical mode, and a pitch of the lens ML in the vertical direction is Plv. The pitch Ply of the lens ML in the vertical direction is determined as Equation 7.

$$Plv = Pbv \times \frac{D}{D + \frac{d}{n}} \quad \text{[Equation 7]}$$

Referring again to FIG. 3, a width Pbh/2 of the transmitting area of the barrier in the horizontal direction may be determined as a width of one of the second electrodes. Alternatively, a width Pbh/2 of the transmitting area of the barrier in the horizontal direction may be determined as a sum of widths of the plural second electrodes. Thus, the pitch Pbh of the barrier unit in the horizontal direction and the pitch Peh of the second electrode have relationship as following Equation 8.

$$Pbh = 2 \times x \times Peh \quad \text{[Equation 8]}$$

Herein, x is a positive integer. When the display apparatus further includes the viewpoint detector 700, x may be a positive integer equal to or greater than 2.

A width Pbv/2 of the transmitting area of the barrier in the vertical direction may be determined as a width of one of the first electrodes. Alternatively, a width Pbv/2 of the transmitting area of the barrier in the vertical direction may be determined as a sum of widths of the plural first electrodes. Thus, the pitch Pbv of the barrier unit in the vertical direction and the pitch Pev of the first electrode have relationship as following Equation 9.

$$Pbv = 2 \times y \times Pev \quad \text{[Equation 9]}$$

Herein, y is a positive integer. When the display apparatus further includes the viewpoint detector 700, y may be a positive integer equal to or greater than 2. In the present exemplary embodiment, y may be equal to x.

FIG. 6 is a conceptual diagram illustrating a plurality of the barriers corresponding to one lens ML of FIG. 1 where the one lens ML has a circular base.

Referring to FIG. 6, one lens ML corresponds to plural barriers. For example, one lens ML corresponds to the barriers disposed in an M by M matrix. In the present exemplary embodiment, one lens ML1 corresponds to four, selectively activateable barriers B11, B12, B21 and B22 disposed in a two by two matrix (2×2 matrix). For example, the circular lens ML1 corresponds to four square barriers B11, B12, B21 and B22. Centers of the first to fourth barriers B11, B12, B21 and B22 may form a square. In the present exemplary embodiment, x is 1 and y is 1 in Equations 8 and 9.

From the viewpoint of the viewer, the area of one lens ML1 of the lens part 340 substantially overlaps four barriers B11, B12, B21 and B22 of the barrier part 320 as shown in FIG. 6. When the lens part 340 and the barrier part are seen as disposed on a same plane, and due to a projection magnifying factor; a radius of the lens ML1 may not be equal to a length of a side of one of the barriers B11, B12, B21 and B22. For example, the radius of the lens ML1 may be slightly less than the length of the side of one of the barriers B11, B12, B21 and B22.

Each of the barriers B11, B12, B21 and B22 is selectively placed in a respective one of the light transmitting state and the light blocking state. The light transmitted through the barriers having the transmitting states is refracted at the lens ML1 and transmitted (projected) to a respective one eye of the viewer while the blacked out imagery of the barriers having the light blocking states can be said to be projected to the other eye.

Figure 7A:
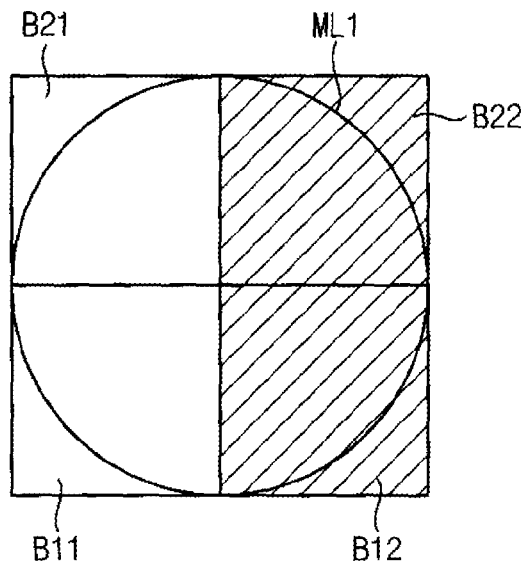
FIGS. 7A and 7B are conceptual diagrams corresponding to states of the barriers corresponding to one lens of FIG. 1 in a horizontal mode.
Figure 7B:
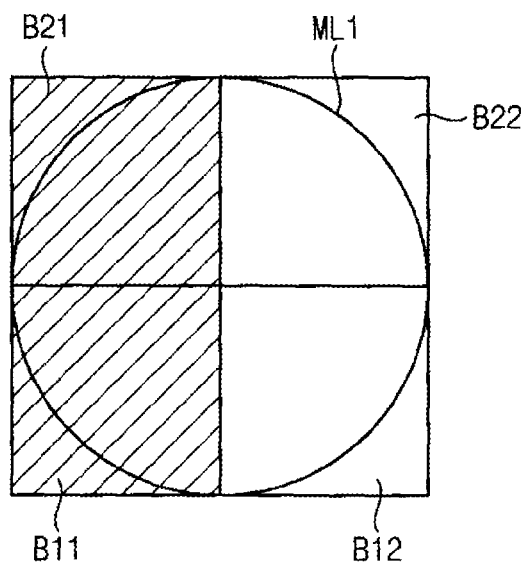

FIGS. 7A and 7B are conceptual diagrams corresponding to states of the barriers B11, B12, B21 and B22 corresponding to one lens ML1 of FIG. 1 in the horizontal mode.

Referring to FIG. 7A, a first barrier B11 and a third barrier B21 which are adjacent to each other in the vertical direction have the transmitting states during the first subframe in the horizontal mode. A second barrier B12 and a fourth barrier B22 which are adjacent to each other in the vertical direction have the blocking states during the first subframe in the horizontal mode.

The light transmitting the barriers B11 and B21 having the transmitting states is refracted at the lens ML1 and transmitted to (projected to) the right eye RE of the viewer.

Referring to FIG. 7B, the second barrier B12 and the fourth barrier B22 which are adjacent to each other in the vertical direction have the transmitting states during the second subframe in the horizontal mode. The first barrier B11 and the third barrier B21 which are adjacent to each other in the vertical direction have the blocking states during the second subframe in the horizontal mode.

The light transmitting the barriers B12 and B22 having the transmitting states is refracted at the lens ML1 and transmitted to (projected to) the left eye LE of the viewer during that subframe.

Therefore, the viewer may recognize the 3D image in the horizontal mode due to the alternating projections to the left and right eyes during the respective subframes.

Figure 8A:
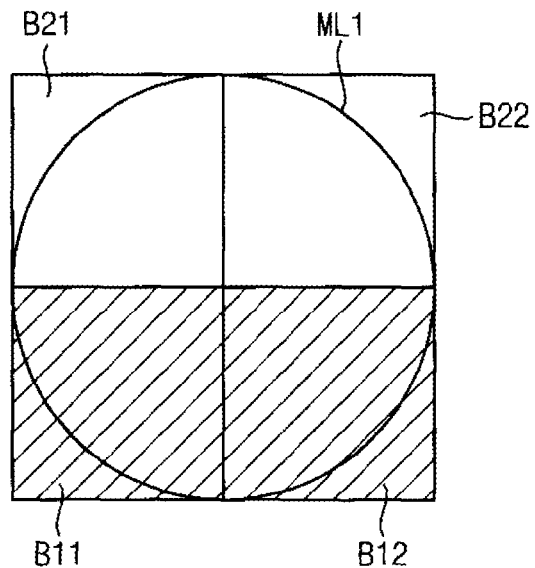
FIGS. 8A and 8B are conceptual diagrams corresponding to states of the barriers corresponding to one lens of FIG. 1 in a vertical mode.
Figure 8B:
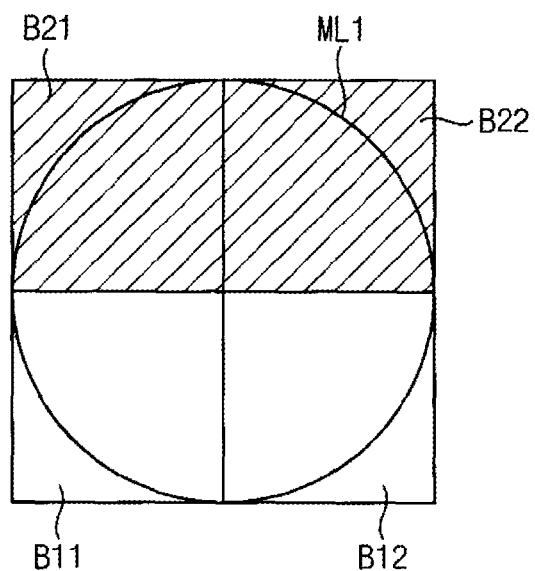

FIGS. 8A and 8B are conceptual diagrams corresponding to states of the barriers B11, B12, B21 and B22 corresponding to one lens ML1 of FIG. 1 in the vertical mode.

Referring to FIG. 8A, the third barrier B21 and the fourth barrier B22 which are adjacent to each other in the horizontal direction have the transmitting states during the first subframe in the vertical mode. The first barrier B11 and the second barrier B12 which are adjacent to each other in the horizontal direction have the blocking states during the first subframe in the vertical mode.

The light transmitting the barriers B21 and B22 having the transmitting states is refracted at the lens ML1 and transmitted to the right eye RE of the viewer during the respective subframe.

Referring to FIG. 8B, the first barrier B11 and the second barrier B12 which are adjacent to each other in the horizontal direction have the transmitting states during the second subframe in the vertical mode. The third barrier B21 and the fourth barrier B22 which are adjacent to each other in the horizontal direction have the blocking states during the first subframe in the vertical mode.

The light transmitting the barriers B11 and B12 having the transmitting states is refracted at the lens ML1 and transmitted to the left eye LE of the viewer.

Therefore, the viewer may recognize the 3D image in the vertical mode during the respective subframes.

According to the present exemplary embodiment, the display apparatus may display the 3D image when two eyes of the viewer are either disposed in the horizontal direction or in the vertical direction by using the barriers disposed in the matrix form and the lenses corresponding to the barriers.

Figure 9:
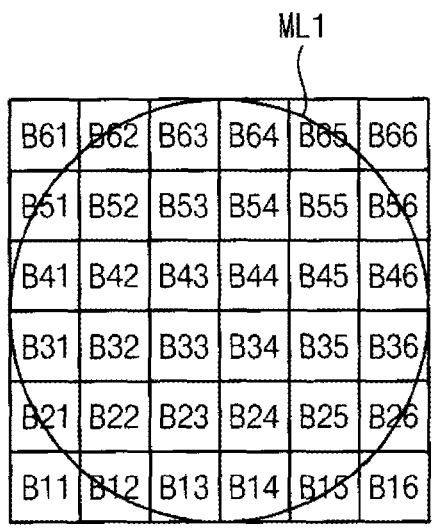
FIG. 9 is a conceptual diagram illustrating a plurality of barriers corresponding to one lens of a display apparatus according to an exemplary embodiment.

FIG. 9 is a conceptual diagram illustrating another embodiment wherein a greater plurality of barriers correspond to one lens of a display apparatus as compared to the exemplary embodiment of FIG. 6.

For the case of FIG. 9, the display apparatus and the method of displaying the 3D image according to the present exemplary embodiment are substantially the same as the display apparatus and the method of displaying the 3D image explained referring to FIGS. 1 to 8B except for a structure of the barrier part 320, a structure of the lens part 340 and an operation of the lens part. Thus, the same reference numerals will be used to refer to the same or like parts as those described in FIGS. 1 to 8B and any repetitive explanation concerning the above elements will be omitted.

Referring to FIGS. 1 and 9, the display apparatus includes a light source part 100, a display panel 200, a directional light projecting element 300, a light source driver 400, a display panel driver 500 and a barrier driver 600. The display apparatus may further include a viewpoint detector 700.

One lens ML corresponds to the plural barriers. For example, one lens ML corresponds to the barriers disposed in an M by M matrix where M is greater than 2. In the present exemplary embodiment, one lens ML1 corresponds to 36 barriers B11 to B66 disposed in a six by six matrix. For example, the circular lens ML1 corresponds to 36 square barriers B11 to B66. In the present exemplary embodiment, x is 3 and y is 3 in Equations 8 and 9.

In the present exemplary embodiment, the width of the transmitting area of the barrier corresponds to widths of three barriers so that the display apparatus may be operated in the inclination mode, in which two eyes of the viewer are disposed in an inclined direction (e.g., 45 degrees) with respect to the display panel 200. The operation of the display panel 200 in the inclination mode may be explained referring to FIGS. 12A and 12B in detail. In addition, the transmitting states and the blocking states may be precisely adjusted according to the move of the viewpoint of the viewer so that a viewpoint tracking method may be well applied to the display apparatus. The viewpoint tracking method may be further explained referring to FIGS. 13A to 13C in detail.

Each of the barriers B11 to B66 has one of the transmitting state and the blocking state. The light transmitting the barriers having the transmitting states is refracted at the lens ML1 and transmitted to the eye of the viewer.

Figure 10A:
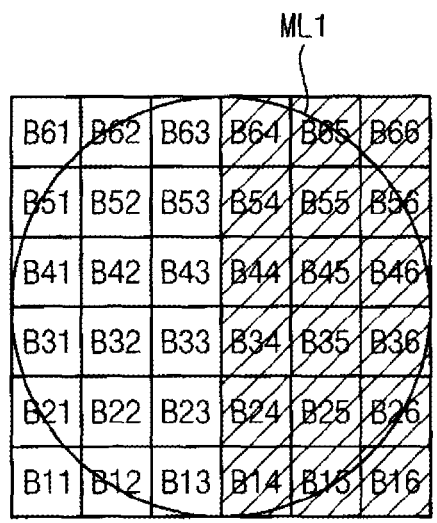
FIGS. 10A and 10B are conceptual diagrams corresponding to states of the barriers corresponding to one lens of FIG. 9 in a horizontal mode.
Figure 10B:
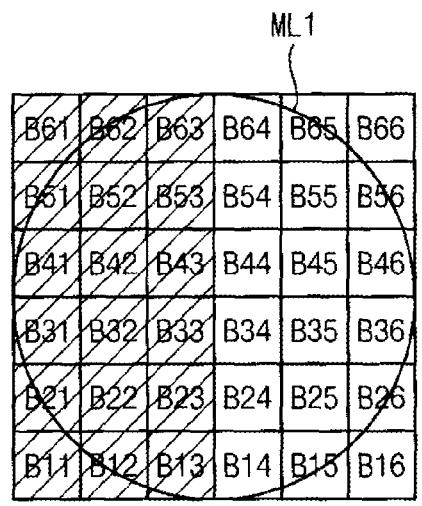

FIGS. 10A and 10B are conceptual diagrams corresponding to states of the barriers B11 to B66 corresponding to one lens ML1 of FIG. 9 in the horizontal mode.

Referring to FIG. 10A, barriers in first to third columns B11 to B13, B21 to B23, B31 to B33, B41 to B43, B51 to B53 and B61 to B63 have the transmitting states during the first subframe in the horizontal mode. Barriers in fourth to sixth columns B14 to B16, B24 to B26, B34 to B36, B44 to B46, B54 to B56 and B64 to B66 have the blocking states during the first subframe in the horizontal mode.

The light transmitting the barriers B11 to B13, B21 to B23, B31 to B33, B41 to B43, B51 to B53 and B61 to B63 having the transmitting states is refracted at the lens ML1 and transmitted to the right eye RE of the viewer.

Referring to FIG. 10B, the barriers in the fourth to sixth columns B14 to B16, B24 to B26, B34 to B36, B44 to B46, B54 to B56 and B64 to B66 have the transmitting states during the second subframe in the horizontal mode. The barriers in the first to third columns B11 to B13, B21 to B23, B31 to B33, B41 to B43, B51 to B53 and B61 to B63 have the blocking states during the second subframe in the horizontal mode.

The light transmitting the barriers B14 to B16, B24 to B26, B34 to B36, B44 to B46, B54 to B56 and B64 to B66 having the transmitting states is refracted at the lens ML1 and transmitted to the left eye LE of the viewer.

Therefore, the viewer may recognize the 3D image in the horizontal mode.

Figure 11A:
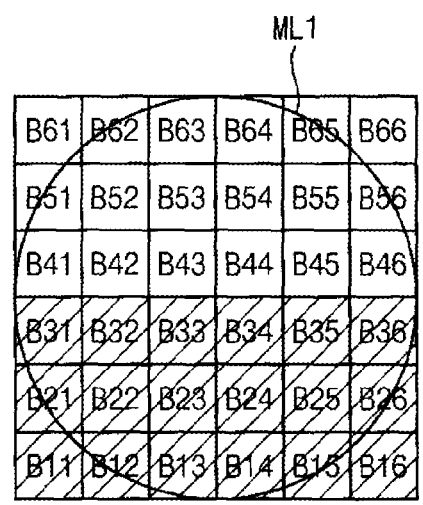
FIGS. 11A and 11B are conceptual diagrams corresponding to states of the barriers corresponding to one lens of FIG. 9 in a vertical mode.
Figure 11B:
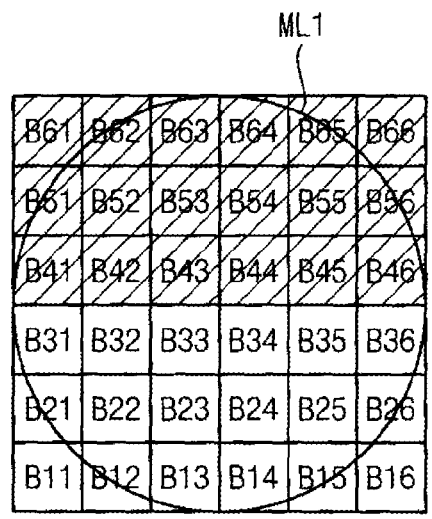

FIGS. 11A and 11B are conceptual diagrams corresponding to states of the barriers B11 to B66 corresponding to one lens ML1 of FIG. 9 in the vertical mode.

Referring to FIG. 11A, barriers in fourth to sixth rows B41 to B46, B51 to B56 and B61 to B66 have the transmitting states during the first subframe in the vertical mode. Barriers in first to third rows B11 to B16, B21 to B26 and B31 to B36 have the blocking states during the first subframe in the vertical mode.

The light transmitting the barriers B41 to B46, B51 to B56 and B61 to B66 having the transmitting states is refracted at the lens ML1 and transmitted to the right eye RE of the viewer.

Referring to FIG. 11B, the barriers in the first to third rows B11 to B16, B21 to B26 and B31 to B36 have the transmitting states during the second subframe in the vertical mode. The barriers in the fourth to sixth rows B41 to B46, B51 to B56 and B61 to B66 have the blocking states during the first subframe in the vertical mode.

The light transmitting the barriers B11 to B16, B21 to B26 and B31 to B36 having the transmitting states is refracted at the lens ML1 and transmitted to the left eye LE of the viewer.

Therefore, the viewer may recognize the 3D image in the vertical mode.

Figure 12A:
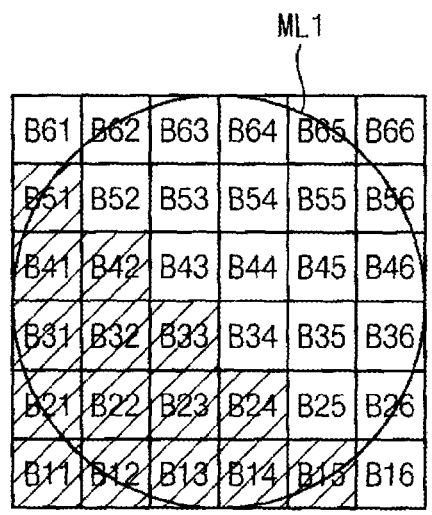
FIGS. 12A and 12B are conceptual diagrams corresponding to states of the barriers corresponding to one lens of FIG. 9 in an inclination mode.
Figure 12B:
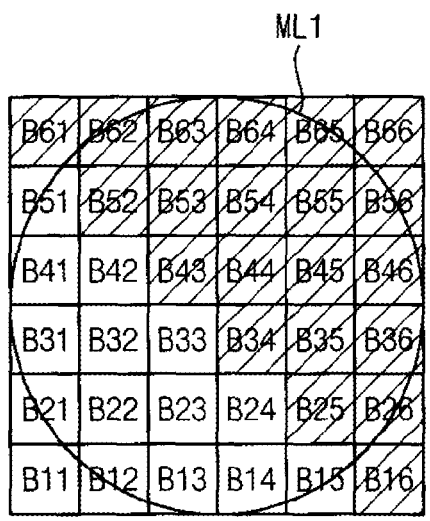

FIGS. 12A and 12B are conceptual diagrams corresponding to states of the barriers corresponding to one lens ML of FIG. 9 in an inclination mode (e.g., 45 degrees).

Referring to FIG. 12A, barriers B61, B52, B43, B34, B25, B16, B62, B53, B44, B35, B26, B63, B54, B45, B36, B64, B5, B46, B65, B56 and B66, which are adjacent in an inclined direction, have the transmitting states during the first subframe in the inclination mode. Barriers B51, B42, B33, B24, B15, B41, B32, B23, B14, B31, B22, B13, B21, B12, and B11, which are adjacent in the inclined direction, have the blocking states during the first subframe in the inclination mode.

Only the barriers corresponding to one lens ML1 are illustrated in FIG. 12A. Other barriers may be arranged such that the barriers having the transmitting states are continuously connected to the barriers in FIG. 12A in the inclined direction and the barriers having the blocking states are continuously connected to the barriers in FIG. 12A in the inclined direction.

The light transmitting the barriers B61, B52, B43, B34, B25, B16, B62, B53, B44, B35, B26, B63, B54, B45, B36, B64, B5, B46, B65, B56 and B66 having the transmitting states is refracted at the lens ML1 and transmitted to the right eye RE of the viewer.

Referring to FIG. 12B, the barriers B51, B42, B33, B24, B15, B41, B32, B23, B14, B31, B22, B13, B21, B12, and B11, which are adjacent in the inclined direction, have the transmitting states during the second subframe in the inclination mode. The barriers B61, B52, B43, B34, B25, B16, B62, B53, B44, B35, B26, B63, B54, B45, B36, B64, B5, B46, B65, B56 and B66, which are adjacent in the inclined direction, have the blocking states during the second subframe in the inclination mode.

The light transmitting the barriers B51, B42, B33, B24, B15, B41, B32, B23, B14, B31, B22, B13, B21, B12, and B11 having the transmitting states is refracted at the lens ML1 and transmitted to the left eye LE of the viewer.

Therefore, the viewer may recognize the 3D image in the inclination mode.

In the inclination mode, the barriers having the transmitting states are disposed in a direction substantially perpendicular to a line connecting two eyes of the viewer. Although the two eyes of the viewer are inclined in an angle of say, 45 degree with respect to the display panel 200 in FIGS. 12A and 12B, the inclined angle of the two eyes of the viewer of the present invention is not limited thereto and the particular barriers that are selectively switched into the light-passing mode versus the light-blocking mode may be varied so as to correspond to other angles of inclination.

Figure 13A:
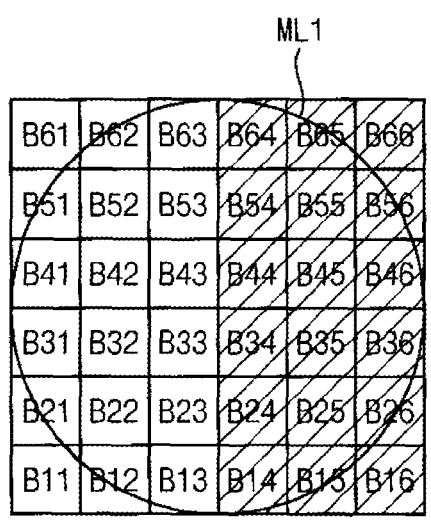
FIGS. 13A to 13C are conceptual diagrams corresponding to states of the barriers corresponding to one lens of FIG. 9 when a viewpoint of the viewer moves.
Figure 13B:
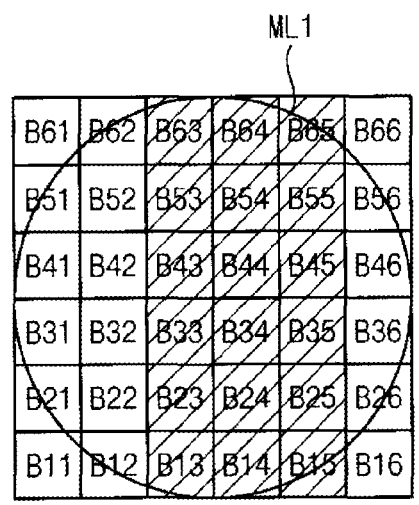
Figure 13C:
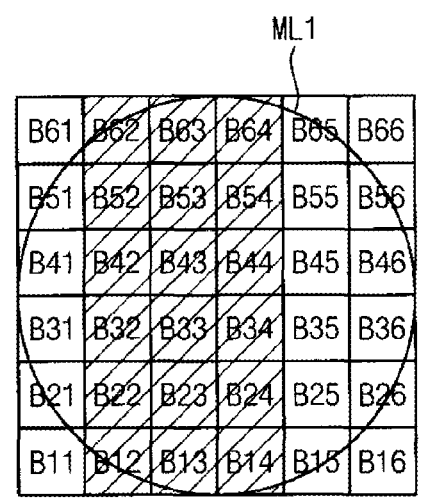

FIGS. 13A to 13C are conceptual diagrams corresponding to states of the barriers corresponding to one lens ML of FIG. 9 when a viewpoint of the viewer moves in the horizontal direction relative to the respective one lens ML.

For example, in FIGS. 13A to 13C, the display panel 200 is operated in the horizontal mode and the viewpoint moves in the same subframe (for example, the first subframe).

Referring to FIG. 13A, the barriers in the first to third columns B11 to B13, B21 to B23, B31 to B33, B41 to B43, B51 to B53 and B61 to B63 have the transmitting states. The barriers in the fourth to sixth columns B14 to B16, B24 to B26, B34 to B36, B44 to B46, B54 to B56 and B64 to B66 have the blocking states.

The light transmitting the barriers B11 to B13, B21 to B23, B31 to B33, B41 to B43, B51 to B53 and B61 to B63 having the transmitting states is refracted at the lens ML1 and transmitted to the right eye RE of the viewer.

Referring to FIG. 13B, the viewpoint of the viewer moves in the horizontal direction compared to the viewpoint in FIG. 13A. The viewpoint detector 700 detects the move of the viewpoint of the viewer. The barrier driver 600 may adjust the transmitting states of the barriers and the blocking states of the barriers according to the move of the viewpoint of the viewer.

A moving direction of the barriers having the transmitting states may be opposite to a moving direction of the viewpoint of the viewer.

The barriers in first, second and sixth columns B11, B12, B16, B21, B22, B26, B31, B32, B36, B41, B42, B46, B51, B52, B56, B61, B62 and B66 have the transmitting states. The barriers in third to fifth columns B13 to B15, B23 to B25, B33 to B35, B43 to B45, B53 to B55 and B63 to B65 have the blocking states.

The light transmitting the barriers B11, B12, B16, B21, B22, B26, B31, B32, B36, B41, B42, B46, B51, B52, B56, B61, B62 and B66 having the transmitting states is refracted at the lens ML1 and transmitted to the right eye RE of the viewer.

Referring to FIG. 13C, the viewpoint of the viewer moves in the horizontal direction compared to the viewpoint in FIG. 13B. The viewpoint detector 700 detects the move of the viewpoint of the viewer. The barrier driver 600 may adjust the transmitting states of the barriers and the blocking states of the barriers according to the move of the viewpoint of the viewer.

The barriers in first, fifth and sixth columns B11, B15, B16, B21, B25, B26, B31, B35, B36, B41, B45, B46, B51, B55, B56, B61, B65 and B66 have the transmitting states. The barriers in second to fourth columns B12 to B14, B22 to B24, B32 to B34, B42 to B44, B52 to B54 and B62 to B64 have the blocking states.

The light transmitting the barriers B11, B15, B16, B21, B25, B26, B31, B35, B36, B41, B45, B46, B51, B55, B56, B61, B65 and B66 having the transmitting states is refracted at the lens ML1 and transmitted to the right eye RE of the viewer.

Therefore, the viewer may recognize the 3D image using the viewpoint tracking method when the viewpoint of the viewer moves.

Although the viewpoint of the viewer moves in the horizontal mode in FIGS. 13A to 13C, the present disclosure of invention is not limited thereto. According to the present viewpoint tracking method, the viewer may recognize the 3D image using the viewpoint tracking method in the vertical mode and/or in the inclination mode.

According to the present exemplary embodiment, the display apparatus may display the 3D image when two eyes of the viewer are disposed in the horizontal direction, in the vertical direction and/or in the inclination direction using the barriers disposed in the matrix form and the lenses corresponding to the barriers. In addition, the display apparatus may display the 3D image when the viewpoint of the viewer moves relative to the respective lenses.

Figure 14:
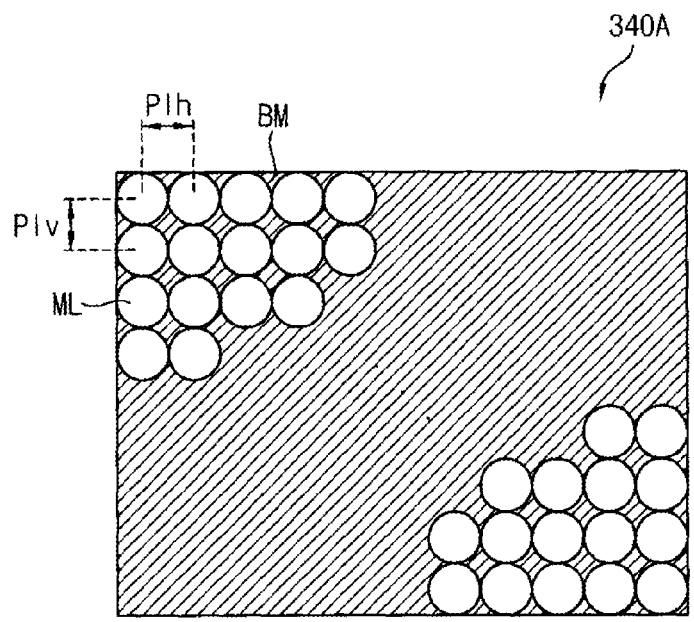
FIG. 14 is a plan view illustrating a lens part according to an exemplary embodiment.

FIG. 14 is a plan view illustrating a lens part 340A according to an exemplary embodiment.

The display apparatus and the method of displaying the 3D image according to the present exemplary embodiment are substantially the same as the display apparatus and the method of displaying the 3D image explained referring to FIGS. 1 to 8B except for the shapes, sizes and/or the arrangements of the individual lenses ML of the lens part. Thus, the same reference numerals will be used to refer to the same or like parts as those described in FIGS. 1 to 8B and any repetitive explanation concerning the above elements will be omitted.

Referring to FIGS. 1 and 14, the display apparatus includes a light source part 100, a display panel 200, a directional light projecting element 300, a light source driver 400, a display panel driver 500 and a barrier driver 600. The display apparatus may further include a viewpoint detector 700.

The directional light projecting element 300 includes a barrier part 320 and a lens part 340A.

The lens part 340A includes a plurality of lenses ML. The lenses ML may be disposed in the first direction D1 and the second direction D2 to form respective rows and columns.

For example, each of the lens ML has a circular shape at its base. For example, a bottom portion of the lens ML has a circular shape in a plan view and an upper portion of the lens ML has a circular shape having a radius less than a radius of the bottom portion.

In the present exemplary embodiment, centers of four lenses ML form a square.

A pitch Plh of the lens ML in the first direction D1 is defined as a distance between the adjacent lenses ML in the first direction D1. A pitch Plv of the lens ML in the second direction D2 is defined as a distance between the adjacent lenses ML in the second direction D2. In the present exemplary embodiment, the pitch Plh of the lens ML in the first direction D1 may be equal to the pitch Plv of the lens ML in the second direction D2.

The lens part 340A further includes a light blocking material BM (black matrix) disposed where the lenses ML are not disposed. The light blocking material BM blocks the light, which transmitted from the barrier part 320, at an area not corresponding to the lenses ML. A crosstalk may be prevented by the light blocking material BM.

According to the present exemplary embodiment, the display apparatus may display the 3D image when two eyes of the viewer are disposed in the horizontal direction and in the vertical direction using the barriers disposed in the matrix form and the lenses corresponding to the barriers.

Figure 15:
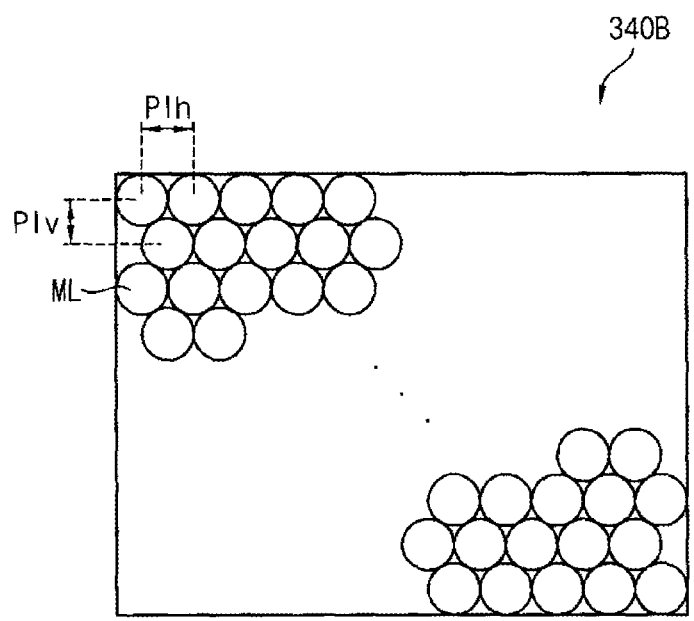
FIG. 15 is a plan view illustrating a lens part according to an exemplary embodiment.

FIG. 15 is a plan view illustrating a lens part 340B according to an exemplary embodiment.

The display apparatus and the method of displaying the 3D image according to the present exemplary embodiment are substantially the same as the display apparatus and the method of displaying the 3D image explained referring to FIGS. 1 to 8B except for the shapes, sizes and arrangement of the lenses ML of the lens part. Thus, the same reference numerals will be used to refer to the same or like parts as those described in FIGS. 1 to 8B and any repetitive explanation concerning the above elements will be omitted.

Referring to FIGS. 1 and 15, the display apparatus includes a light source part 100, a display panel 200, a directional light projecting element 300, a light source driver 400, a display panel driver 500 and a barrier driver 600. The display apparatus may further include a viewpoint detector 700.

The directional light projecting element 300 includes a barrier part 320 and a lens part 340B.

The lens part 340B includes a plurality of lenses ML. The lenses ML may be packed in accordance with a hexagonal packing arrangement such that they are disposed in the first direction D1 and a direction inclined in an inclined direction from the first direction D1. For example, the inclined direction may have 60 degree.

For example, the lens ML has a circular shape. For example, a bottom portion of the lens ML has a circular shape in a plan view and an upper portion of the lens ML has a circular shape having a radius less than a radius of the bottom portion.

In the present exemplary embodiment, centers of three lenses ML form an isometric triangle. An area where the lenses ML are not disposed relatively decreases so that a light efficiency of the display apparatus may be improved.

A pitch Plh of the lens ML in the first direction D1 is defined as a distance between the adjacent lenses ML in the first direction D1. A pitch Plv of the lens ML in the second direction D2 is defined as a distance between the adjacent lenses ML in the second direction D2. In the present exemplary embodiment, the pitch Plh of the lens ML in the first direction D1 may be greater than the pitch Plv of the lens ML in the second direction D2. Accordingly, the pitch Pbh of the barrier unit in the first direction D1 may be greater than the pitch Pbv of the barrier unit in the second direction D2

According to the present exemplary embodiment, the display apparatus may display the 3D image when two eyes of the viewer are disposed in the horizontal direction and in the vertical direction using the barriers disposed in the matrix form and the lenses corresponding to the barriers.

Figure 16:
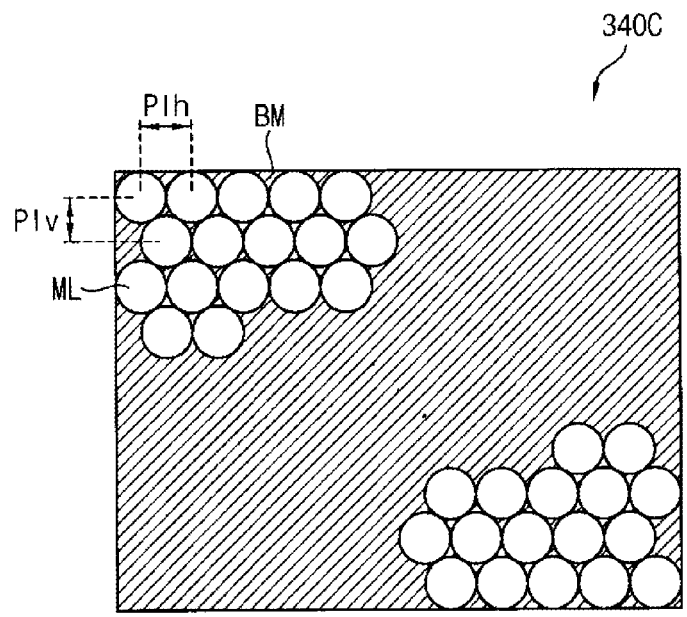
FIG. 16 is a plan view illustrating a lens part according to an exemplary embodiment.

FIG. 16 is a plan view illustrating a lens part 340C according to an exemplary embodiment.

The display apparatus and the method of displaying the 3D image according to the present exemplary embodiment are substantially the same as the display apparatus and the method of displaying the 3D image explained referring to FIGS. 1 to 8B except for the shapes, sizes, arrangement of the lenses of the lens part and the presence of the black matrix (BM). Thus, the same reference numerals will be used to refer to the same or like parts as those described in FIGS. 1 to 8B and any repetitive explanation concerning the above elements will be omitted.

Referring to FIGS. 1 and 16, the display apparatus includes a light source part 100, a display panel 200, a directional light projecting element 300, a light source driver 400, a display panel driver 500 and a barrier driver 600. The display apparatus may further include a viewpoint detector 700.

The directional light projecting element 300 includes a barrier part 320 and a lens part 340C.

The lens part 340C includes a plurality of lenses ML. The lenses ML may be disposed in the first direction D1 and a direction inclined in an inclined direction from the first direction D1. For example, the inclined direction may have 60 degree.

For example, the lens ML has a circular shape. For example, a bottom portion of the lens ML has a circular shape in a plan view and an upper portion of the lens ML has a circular shape having a radius less than a radius of the bottom portion.

In the present exemplary embodiment, centers of three lenses ML form an isometric triangle. An area where the lenses ML are not disposed relatively decreases so that a light efficiency of the display apparatus may be improved.

A pitch Plh of the lens ML in the first direction D1 is defined as a distance between the adjacent lenses ML in the first direction D1. A pitch Plv of the lens ML in the second direction D2 is defined as a distance between the adjacent lenses ML in the second direction D2. In the present exemplary embodiment, the pitch Plh of the lens ML in the first direction D1 may be greater than the pitch Plv of the lens ML in the second direction D2. Accordingly, the pitch Pbh of the barrier unit in the first direction D1 may be greater than the pitch Pbv of the barrier unit in the second direction D2

The lens part 340C further includes a light blocking material BM disposed where the lenses ML are not disposed. The light blocking material BM blocks the light, which transmitted from the barrier part 320, at an area not corresponding to the lenses ML. A crosstalk may be reduced by the light blocking material BM.

According to the present exemplary embodiment, the display apparatus may display the 3D image when two eyes of the viewer are disposed in the horizontal direction and in the vertical direction using the barriers disposed in the matrix form and the lenses corresponding to the barriers.

Figure 17A:
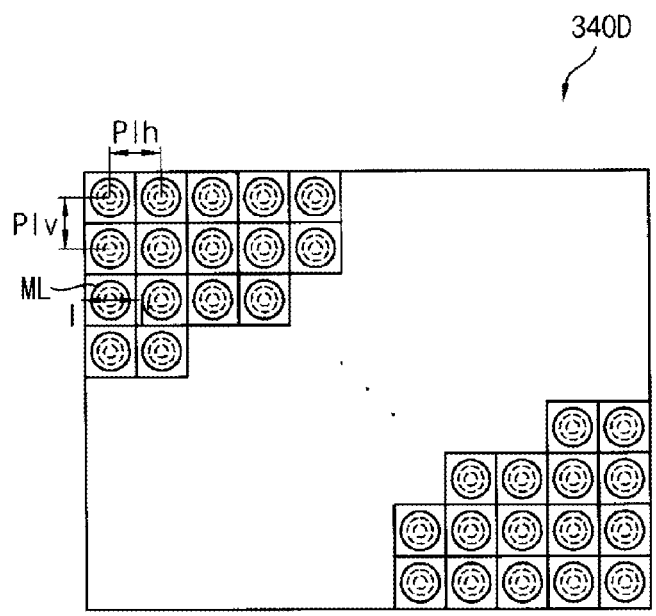
FIG. 17A is a plan view illustrating a lens part according to an exemplary embodiment.
Figure 17B:
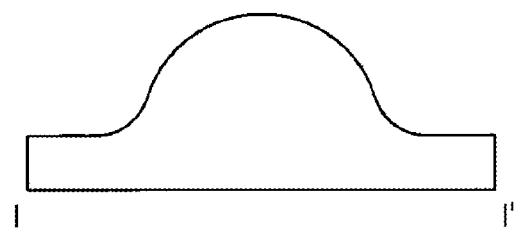
FIG. 17B is a cross-sectional view cut along a line I-I' in FIG. 17A.

FIG. 17A is a plan view illustrating a lens part 340D according to an exemplary embodiment. FIG. 17B is a cross-sectional view cut along a line I-I' in FIG. 17A.

The display apparatus and the method of displaying the 3D image according to the present exemplary embodiment are substantially the same as the display apparatus and the method of displaying the 3D image explained referring to FIGS. 1 to 8B except for respective shapes and sizes of the lenses of the lens part. Thus, the same reference numerals will be used to refer to the same or like parts as those described in FIGS. 1 to 8B and any repetitive explanation concerning the above elements will be omitted.

Referring to FIGS. 1, 17A and 17B, the display apparatus includes a light source part 100, a display panel 200, a directional light projecting element 300, a light source driver 400, a display panel driver 500 and a barrier driver 600. The display apparatus may further include a viewpoint detector 700.

The directional light projecting element 300 includes a barrier part 320 and a lens part 340D.

The lens part 340D includes a plurality of lenses ML. The lenses ML may be disposed in the first direction D1 and the second direction D2 to thereby define rows and columns.

For example, a bottom portion of the lens ML has a square shape and an upper portion of the lens ML has a circular shape. The lens part 340D does not have a portion where the lenses are not disposed so that a light efficiency of the display apparatus may be improved.

In the present exemplary embodiment, centers of four lenses ML form a square.

A pitch Plh of the lens ML in the first direction D1 is defined as a distance between the adjacent lenses ML in the first direction D1. A pitch Plv of the lens ML in the second direction D2 is defined as a distance between the adjacent lenses ML in the second direction D2. In the present exemplary embodiment, the pitch Plh of the lens ML in the first direction D1 may be equal to the pitch Plv of the lens ML in the second direction D2.

According to the present exemplary embodiment, the display apparatus may display the 3D image when two eyes of the viewer are disposed in the horizontal direction and in the vertical direction using the barriers disposed in the matrix form and the lenses corresponding to the barriers.

Figure 18A:
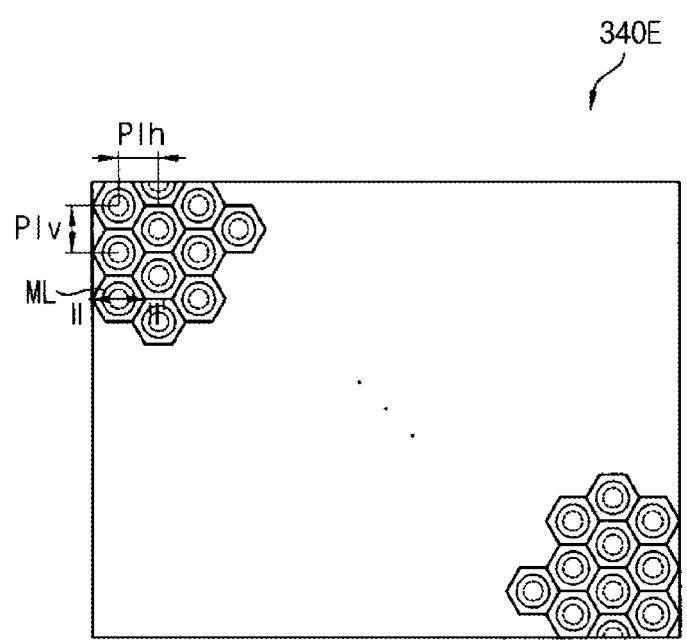
FIG. 18A is a plan view illustrating a lens part according to an exemplary embodiment.
Figure 18B:
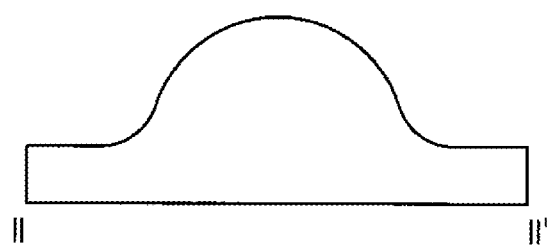
FIG. 18B is a cross-sectional view cut along a line II-IF in FIG. 18A.

FIG. 18A is a plan view illustrating a lens part 340E according to an exemplary embodiment (hexagonal packing embodiment). FIG. 18B is a cross-sectional view cut along a line II-II' in FIG. 18A.

The display apparatus and the method of displaying the 3D image according to the present exemplary embodiment are substantially the same as the display apparatus and the method of displaying the 3D image explained referring to FIGS. 1 to 8B except for the shapes, sizes and arrangement of the lenses of the lens part. Thus, the same reference numerals will be used to refer to the same or like parts as those described in FIGS. 1 to 8B and any repetitive explanation concerning the above elements will be omitted.

Referring to FIGS. 1, 18A and 18B the display apparatus includes a light source part 100, a display panel 200, a directional light projecting element 300, a light source driver 400, a display panel driver 500 and a barrier driver 600. The display apparatus may further include a viewpoint detector 700.

The directional light projecting element 300 includes a barrier part 320 and a lens part 340E.

The lens part 340E includes a plurality of lenses ML. The lenses ML may be disposed in the first direction D1 and a direction inclined in an inclined direction from the first direction D1. For example, the inclined direction may have 60 degree.

For example, a bottom portion of the lens ML has a regular hexagonal shape and an upper portion of the lens ML has a circular shape. The lens part 340E does not have a portion where the lenses are not disposed so that a light efficiency of the display apparatus may be improved.

In the present exemplary embodiment, centers of three lenses ML form an isometric triangle.

A pitch Plh of the lens ML in the first direction D1 is defined as a distance between the adjacent lenses ML in the first direction D1. A pitch Plv of the lens ML in the second direction D2 is defined as a distance between the adjacent lenses ML in the second direction D2. In the present exemplary embodiment, the pitch Plh of the lens ML in the first direction D1 may be less than the pitch Plv of the lens ML in the second direction D2. Accordingly, the pitch Pbh of the barrier unit in the first direction D1 may be less than the pitch Pbv of the barrier unit in the second direction D2.

According to the present exemplary embodiment, the display apparatus may display the 3D image when two eyes of the viewer are disposed in the horizontal direction and in the vertical direction using the barriers disposed in the matrix form and the lenses corresponding to the barriers.

According to the exemplary embodiments of the present disclosure of invention as explained above, the display apparatus may properly represent the 3D image according to a direction of two eyes of the viewer and/or according to a lateral shift of the eyes relative to specific ones of the lenses (ML).

The foregoing is illustrative of the present disclosure of invention and is not to be construed as limiting thereof. Although a few exemplary embodiments in accordance with the present disclosure have been provided, those skilled in the art will readily appreciate in light of the foregoing that many modifications are possible in the exemplary embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures. Therefore, it is to be understood that the foregoing is illustrative of the present disclosure of invention and is not to be construed as limited it to the specific exemplary embodiments disclosed, and that modifications to the disclosed exemplary embodiments, as well as other exemplary embodiments, are intended to be included within the scope of the present teachings.

What is claimed is:

1. A display apparatus comprising:
   a display panel configured to display a first image during a first subframe and a second image during a second subframe;
   a light source part configured to provide backlighting light to the display panel; and
   a directional light projecting element disposed between the display panel and the light source part, and including a barrier part and a lens part, the lens part being disposed above the barrier part;
   wherein the barrier part has a plurality of selectively activateable barriers defined by a corresponding plurality of elongated first electrodes extending in a first direction and a plurality of elongated second electrodes extending in a second direction different from the first direction and thus crossing with the elongated first electrodes; and
   wherein the lens part has a plurality of lenses disposed in accordance with an area tessellating pattern, each of the lenses having a coverage area corresponding to a respective subplurality of the barriers, and
   wherein a vertical pitch of the first electrode is equal to a horizontal pitch of the second electrode, and the vertical pitch of the elongated first electrodes is defined as a center-to-center distance between the adjacent elongated first electrodes, and the horizontal pitch of the elongated second electrodes is defined as a center-to-center distance between the adjacent elongated second electrodes, and
   wherein the barriers have a matrix configuration defined by crossing of the elongated first electrodes and the elongated second electrodes.

2. The display apparatus of claim 1, wherein each one lens corresponds to a respective subplurality of barriers disposed in an M by M matrix, where M is a positive integer equal to or greater than 2.

3. The display apparatus of claim 1, wherein each lens has a circular shape at least at a base portion thereof.

4. The display apparatus of claim 3, wherein centers of four lenses adjacent to each other form a square.

5. The display apparatus of claim 3, wherein centers of three lenses adjacent to each other form an isometric triangle.

6. The display apparatus of claim 3, wherein the lens part further comprises a light blocking material disposed where the lenses are not disposed.

7. The display apparatus of claim 1, wherein:
   a bottom portion of the lens has a square shape, and
   an upper portion of the lens has a circular shape.

8. The display apparatus of claim 1, wherein
   a bottom portion of the lens has a regular hexagonal shape, and
   an upper portion of the lens has a circular shape.

9. The display apparatus of claim 1, wherein a predefined proper distance for a viewer to view a three-dimensional ("3D") image from a principal point of the lens is equal to D, a focal length of the lens is equal to f, a distance between the principal point of the lens and the barrier part is equal to d, a refractive index of the lens is equal to n, and a relationship between the said parameters is substantially defined by the following equation:

$$d = \frac{n}{\left(\frac{1}{f} - \frac{1}{D}\right)}.$$

10. The display apparatus of claim 9, wherein a projection area dimension of a viewpoint image corresponding to one eye of the viewer at the proper distance D is equal to PE, a pitch of a barrier unit, which includes the barriers corresponding to one lens, in the first direction is equal to Pb, and $$Pb = 2 \times PE \times \frac{d}{n \times D}.$$

11. The display apparatus of claim 10, wherein a pitch of the lens in the first direction is Pl, and $$Pl = Pb \times \frac{D}{D + \frac{d}{n}}.$$

12. The display apparatus of claim 10, wherein the projected area dimension PE of the viewpoint image corresponding to one eye of the viewer at the proper distance D is equal to a distance between two eyes of an average viewer.

13. The display apparatus of claim 1, wherein:
the display panel is operable in a horizontal mode, in which two eyes of a viewer are disposed in a horizontal direction relative to a corresponding horizontal axis of the display panel,
the display panel is operable in a vertical mode, in which two eyes of the viewer are disposed in a vertical direction relative to the horizontal axis of the display panel,
those of the barriers that are selectively activated to have respective light transmitting states in each subframe are disposed as lines extending in the vertical direction when in the horizontal mode, and
those of the barriers that are selectively activated to have respective light transmitting states in each subframe are disposed as lines extending in the horizontal direction when in the vertical mode.

14. The display apparatus of claim 1, wherein the display panel is operable in an inclination mode, in which two eyes of a viewer are disposed in a direction inclined with respect to the horizontal axis of the display panel, and
those of the barriers that are selectively activated to have respective light transmitting states in each subframe are disposed as lines extending in a direction substantially perpendicular to a line connecting two eyes of the viewer in the inclination mode.

15. The display apparatus of claim 1, further comprising a viewpoint detector/determiner configured to track and/or determine a viewpoint of a viewer.

16. The display apparatus of claim 15, wherein the transmitting states of the barriers of the barrier part and the blocking states of the barriers of the barrier part are adjusted according to a move of the viewpoint of the viewer relative to lenses of the lens part.

17. A method of displaying a three-dimensional ("3D") image, the method comprising:
providing first image data to a display panel during a first subframe and different second image data to the display panel during a second subframe;
providing backlighting light to the display panel;
selectively projecting the light through a directional light projecting element in accordance with a first set of projecting angles during the first subframe and in accordance with a different second set of projecting angles during the second subframe, and
wherein the directional light projecting element comprises a barrier part and a lens part and
wherein the barrier part has a plurality of barriers defined as a plurality of elongated first electrodes extending in a first direction and a plurality of elongated second electrodes extending in a second direction different from the first direction and crossing with the elongated first electrodes;
wherein the lens part has a plurality of lenses disposed in a first direction and a second direction crossing the first direction, each of the lenses corresponding to a sub-plurality of the barriers, and
where the method includes:
refracting light selectively passed through the barrier part using respective lenses of the lens part, and
wherein a vertical pitch of the first electrode is equal to a horizontal pitch of the second electrode, and the vertical pitch of the elongated first electrodes is defined as a center-to-center distance between the adjacent elongated first electrodes, and the horizontal pitch of the elongated second electrodes is defined as a center-to-center distance between the adjacent elongated second electrodes, and
wherein the barriers have a matrix configuration defined by crossing of the elongated first electrodes and the elongated second electrodes.

18. The method of claim 17, wherein one lens corresponds to the barriers disposed in an M by M matrix, and
M is a positive integer equal to or greater than 2.

19. The method of claim 17, wherein a predetermined proper distance for a viewer to view the 3D image from a principal point of the lens is equal to D, a focal length of the lens is equal to f, a distance between the principal point of the lens and the barrier part is equal to d, a refractive index of the lens is equal to n, and $$d = \frac{n}{\left(\frac{1}{f} - \frac{1}{D}\right)}.$$

20. The method of claim 19, wherein a projected area of a viewpoint image corresponding to one eye of the viewer at the proper distance D has a dimension of PE, a pitch of a barrier unit, which includes the barriers corresponding to one lens, in the first direction is equal to Pb, and $$Pb = 2 \times PE \times \frac{d}{n \times D}.$$

21. The method of claim 20, wherein a pitch of the lens in the first direction is equal to Pl, and $$Pl = Pb \times \frac{D}{D + \frac{d}{n}}.$$

* * * * *